L. J. WESSEL.
CONDIMENT HOLDER.
APPLICATION FILED JUNE 12, 1915.
1,265,562.
Patented May 7, 1918.
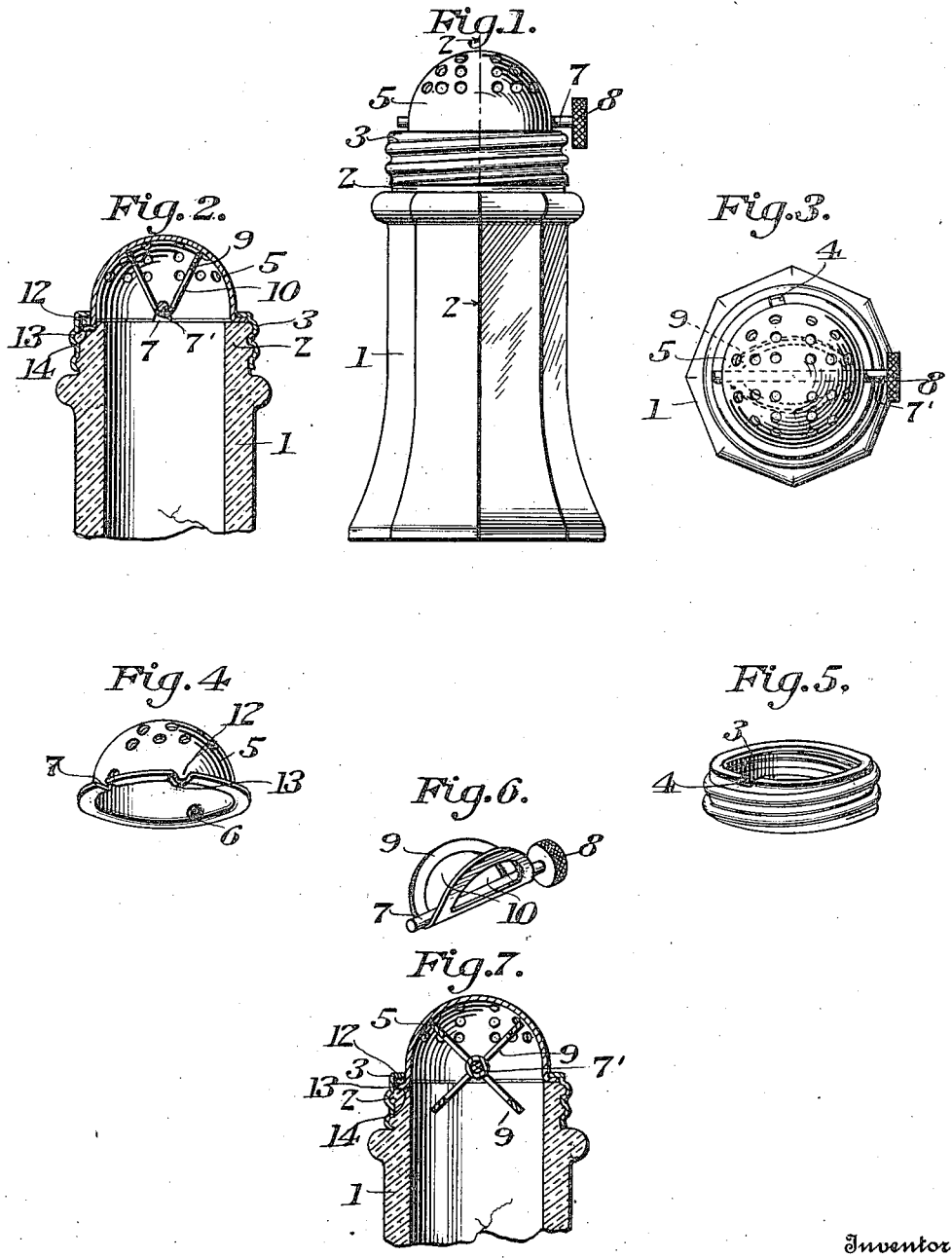

UNITED STATES PATENT OFFICE.

LOUIS JOHN WESSEL, OF TERRE HAUTE, INDIANA.

CONDIMENT-HOLDER.

1,265,562.   Specification of Letters Patent.   Patented May 7, 1918.

Application filed June 12, 1915. Serial No. 33,742.

*To all whom it may concern:*

Be it known that I, LOUIS J. WESSEL, a citizen of the United States, residing at Terre Haute, in the county of Vigo, and State of Indiana, have invented new and useful Improvements in Condiment-Holders, of which the following is a specification.

This invention relates to holders for salt and similar condiments which may become affected by climatic conditions.

The primary object of the invention is to provide the cover of the condiment holder with means for ejecting a portion of the condiment contained within the holder through the openings in the cover of the holder, when the condiment has become affected by atmospheric conditions.

A further object of the invention is to provide the cover with a condiment ejecting means which permits the contents of the holder to have free access to the interior of the cover at all times.

With these and other objects in view the invention consists in the improved construction and novel arrangement and combination of parts which will be hereinafter fully described and particularly pointed out in the appended claim.

The preferred embodiment of the invention has been illustrated in the accompanying drawing, but no limitation is necessarily made to the precise details of construction therein shown, as changes, alterations and modifications within the scope of the appended claim may be resorted to when so desired.

In the drawings:—

Figure 1 is a side elevation partly in section of a condiment holder constructed in accordance with the invention.

Fig. 2 is a vertical transverse sectional view on the line 2—2 of Fig. 1.

Fig. 3 is a top plan view of the condiment holder, the condiment ejecting means within the cover being shown in dotted lines.

Fig. 4 is a detail perspective view of the cover for the condiment holder.

Fig. 5 is a detail perspective view of the cover securing ring.

Fig. 6 is a detail perspective view of the preferred form of condiment ejecting means.

Fig. 7 is a vertical longitudinal sectional view through the condiment holder showing the modification of the invention.

Like characters of reference denote corresponding parts throughout the several views in the drawing.

The numeral 1 designates a holder body which is formed from glass or other suitable material and provided with a threaded neck 2 adapted to receive a shouldered cover securing ring 3. said ring being recessed, as at 4. Disposed upon the neck 2 of the body 1 and retained thereon by means of the ring 3 is a hemispherical shaped cover 5, said cover being perforated and provided at diametrically opposite points with an aperture 6 and a notch 7. Journaled for rotation in the aperture 6 and notch 7 is a transversely extending shaft 7', one end of which is provided with a knurled head 8 by means of which the shaft 7' is rotated. Fixed to the shaft in any suitable manner are a plurality of radially extending and spaced scraper blades 9 which are adapted to be disposed within the cover 5 and closely conform to the contour thereof, each scraper blade 9 being provided with a semi-circular shaped aperture 10 which permits free access to be had by the condiment contained within the holder to the interior of the cover 5 when the scraper blades are positioned therein.

It will be noted from reference to Figs. 1 and 2 of the drawing that the diameter of the cover 5 is greater than the inside diameter of the neck 2 upon the body 1, and that the shouldered ring 3 when connected with the neck and cover spaces the inner peripheral edge of the base of the cover from the peripheral edge of the neck, thereby permitting an annular shoulder to be formed at the juncture of the neck with the cover 5, said shoulder extending inwardly beneath the cover 5 and providing a stop shoulder to limit the swinging movement of the scraper blades within the cover, so that the outer peripheral edge of one of the scraper blades on the shaft 7' is always in contact with the interior of the cover 5 above the neck of the receptacle.

In the modified form of condiment holder as disclosed in Fig. 7 of the drawing the stop shoulder upon the neck of the body 1 has been dispensed with and the shaft 7' has been provided with additional scraper blades 9 which are of similar construction as those disclosed in the preferred form of the invention. It will be noted, however, with reference to Fig. 7 that the shaft 7' is freely rotatable and the action of the scraper blades against the cover 5 is not limited to a swinging action as is the case in the preferred form of the invention.

In practice, when it is desired to force the contents of the holder through the perforated cover 5, the holder is inverted and the contents thereof allowed to flow into the cover through the apertures 10 in the scraper blades, whereupon the shaft 7' is rotated by means of the knurled head 8 to cause the said blade to have swinging movement within the cover 5 and eject the contents of the condiment holder through the perforations therein.

In both the preferred and modified forms of the invention the cover 5 has the flange thereon recessed, as at 12 the walls of the recess providing a projection 13 adapted to fit in a depression 14 in the neck of the receptacle, whereby any tendency on the part of the cover 5 to rotate beneath the ring 3 is prevented.

From the foregoing description taken in connection with the accompanying drawing it is apparent that a plurality of scraper blades will always be positioned within the cover upon the receptacle, and that a condiment holder has been provided which is inexpensive of manufacture and highly efficient in use.

Having thus described the invention, what is claimed as new, is:—

A condiment holder comprising a receptacle, a hemispherical perforated cover disposed upon the mouth thereof and having an internal diameter greater than the diameter of the mouth opening to provide a peripheral stop shoulder, an outwardly extending annular flange on said cover, a ring threaded upon the end of the receptacle and engaging said flange, a shaft extending through said cover and revoluble therein, and scraper blades secured on said shaft and freely movable within said cover, said blades being engageable with said stop shoulder to maintain them always within the cap and being swingable back and forth when said receptacle is shaken.

In testimony whereof I affix my signature in presence of two witnesses.

LOUIS JOHN WESSEL.

Witnesses:
John T. Reynolds,
R. H. Reynolds.